(12) United States Patent
Broder et al.

(10) Patent No.: US 7,991,806 B2
(45) Date of Patent: Aug. 2, 2011

(54) SYSTEM AND METHOD TO FACILITATE IMPORTATION OF DATA TAXONOMIES WITHIN A NETWORK

(75) Inventors: Andrei Zary Broder, Menlo Park, CA (US); Marcus Felipe Fontoura, Los Gatos, CA (US); Vanja Josifovski, Los Gatos, CA (US)

(73) Assignee: Yahoo! Inc., Sunnyvale, CA (US)

( * ) Notice: Subject to any disclaimer, the term of this patent is extended or adjusted under 35 U.S.C. 154(b) by 358 days.

(21) Appl. No.: 11/781,183

(22) Filed: Jul. 20, 2007

(65) Prior Publication Data

US 2009/0024649 A1 Jan. 22, 2009

(51) Int. Cl.
*G06F 17/30* (2006.01)
(52) U.S. Cl. ....... 707/809; 707/810; 707/829; 705/14.4; 706/46
(58) Field of Classification Search .......... 707/809–810, 707/E17.046–E17.048, 999.102, 999.107, 707/705, 706, 829; 706/45–47; 405/14.4–14.73
See application file for complete search history.

(56) References Cited

U.S. PATENT DOCUMENTS

| | | | |
|---|---|---|---|
| 6,401,075 B1 | 6/2002 | Mason et al. | |
| 6,446,061 B1 | 9/2002 | Doerre et al. | |
| 6,484,148 B1 | 11/2002 | Boyd | |
| 6,711,585 B1 * | 3/2004 | Copperman et al. | ....... 707/104.1 |
| 6,712,702 B2 | 3/2004 | Goldberg et al. | |
| 6,785,671 B1 | 8/2004 | Bailey | |
| 7,003,506 B1 | 2/2006 | Fisk | |
| 7,062,510 B1 | 6/2006 | Eldering | |
| 7,136,875 B2 | 11/2006 | Anderson et al. | |
| 7,162,480 B2 * | 1/2007 | Vishik | ........................... 707/101 |
| 7,299,194 B1 * | 11/2007 | Manganaris et al. | ........... 705/10 |
| 7,447,677 B2 * | 11/2008 | Milligan et al. | ................... 707/3 |
| 7,496,943 B1 | 2/2009 | Goldberg et al. | |

(Continued)

FOREIGN PATENT DOCUMENTS

KR 2006-0103034 A 9/2006

OTHER PUBLICATIONS

Written Opinion of the International Searching Authority for Related Foreign Application PCT/US2008/067938, Date: 2008.

(Continued)

*Primary Examiner* — Mohammad Ali
*Assistant Examiner* — Amanda Willis
(74) *Attorney, Agent, or Firm* — Stattler-Suh PC (57) ABSTRACT

A system and method to facilitate importation of data taxonomies within a network are described. Advertiser entities access a data storage module within a network-based entity to retrieve content information from one or more content taxonomies stored within the data storage module. Subsequently, the advertiser entities select advertisements targeted to specific users based on the retrieved content information and further transmit the advertisements to the network-based entity. Furthermore, publisher entities and/or advertiser entities transmit data, such as, for example, associated taxonomy information, to the network-based entity. The entity receives the respective taxonomy information and parses the taxonomy information to extract node information and associated categories related to the received information. Finally, the entity integrates the node information and associated categories into one or more taxonomies stored within the data storage module. Alternatively, the entity maps the node information and associated categories into corresponding nodes within one or more taxonomies stored within the data storage module, and further stores the mapping information into a mapping database within the data storage module.

15 Claims, 9 Drawing Sheets

U.S. PATENT DOCUMENTS

| | | |
|---|---|---|
| 2001/0034762 A1 | 10/2001 | Jacobs et al. |
| 2001/0044837 A1* | 11/2001 | Talib et al. ............... 709/219 |
| 2002/0078192 A1 | 6/2002 | Kopsell et al. |
| 2002/0082923 A1 | 6/2002 | Merriman et al. |
| 2002/0107735 A1 | 8/2002 | Henkin |
| 2002/0123912 A1 | 9/2002 | Subramanian |
| 2002/0161648 A1 | 10/2002 | Mason et al. |
| 2003/0040960 A1 | 2/2003 | Eckmann |
| 2003/0046148 A1 | 3/2003 | Rizzi et al. |
| 2003/0065768 A1 | 4/2003 | Malik |
| 2003/0101095 A1 | 5/2003 | Suzuki |
| 2004/0059708 A1 | 3/2004 | Dean et al. |
| 2004/0158858 A1 | 8/2004 | Paxton |
| 2004/0181525 A1* | 9/2004 | Itzhak et al. ............... 707/5 |
| 2004/0243466 A1 | 12/2004 | Trzybinski et al. |
| 2004/0267725 A1 | 12/2004 | Harik |
| 2005/0033641 A1 | 2/2005 | Jha et al. |
| 2005/0033771 A1 | 2/2005 | Schmitter et al. |
| 2005/0149395 A1 | 7/2005 | Henkin et al. |
| 2005/0165638 A1 | 7/2005 | Piller |
| 2005/0216448 A1 | 9/2005 | Talib et al. |
| 2005/0267872 A1* | 12/2005 | Galai et al. ............... 707/3 |
| 2006/0080300 A1* | 4/2006 | Gruenwald ............... 707/3 |
| 2006/0122994 A1 | 6/2006 | Kapur et al. |
| 2006/0229942 A1 | 10/2006 | Miller |
| 2006/0242017 A1 | 10/2006 | Libes et al. |
| 2006/0287920 A1 | 12/2006 | Perkins et al. |
| 2007/0073758 A1 | 3/2007 | Perry et al. |
| 2007/0174255 A1 | 7/2007 | Sravanapudi et al. |
| 2007/0198341 A1 | 8/2007 | Park |
| 2007/0276926 A1 | 11/2007 | LaJoie et al. |
| 2007/0288454 A1 | 12/2007 | Bolivar |
| 2008/0010142 A1 | 1/2008 | O'Brien et al. |
| 2008/0040175 A1 | 2/2008 | Dellovo |
| 2008/0065624 A1 | 3/2008 | Sun et al. |
| 2008/0086372 A1 | 4/2008 | Madhavan |
| 2008/0086382 A1 | 4/2008 | Ur |
| 2008/0140591 A1 | 6/2008 | Agarwal et al. |
| 2008/0294577 A1 | 11/2008 | Agarwal |
| 2008/0313142 A1 | 12/2008 | Wang et al. |

OTHER PUBLICATIONS

International Search Report for Related Foreign Application PCT/US2008/067938, Date: 2008.

* cited by examiner

SYSTEM AND METHOD TO FACILITATE IMPORTATION OF DATA TAXONOMIES WITHIN A NETWORK

TECHNICAL FIELD

The present invention relates generally to the field of network-based communications and, more particularly, to a system and method to facilitate importation of data taxonomies within a network, such as the internet,

BACKGROUND OF THE INVENTION

The explosive growth of the Internet as a publication and Interactive communication platform has created an electronic environment that is changing the way business is transacted. As the Internet becomes increasingly accessible around the world, users need efficient tools to navigate the Internet and to find content available on various websites, Internet portals provide users an entrance and guide into the vast resources of the Internet. Typically, an Internet portal provides a range of search, email, news, shopping, chat, maps, finance, entertainment, and other content and services. The Internet portal further provides advertising information supplied by advertising entities, which target the users of the portal. Thus, it would be advantageous if the information presented to the users is efficiently and properly categorized and stored within the portal and the advertising information closely matches the content presented to the users.

SUMMARY OF THE INVENTION

A system and method to facilitate importation of data taxonomies within a network are described, in some embodiments, advertiser entities access a data storage module within a network-based entity to retrieve content information from one or more content taxonomies stored within the data storage module. Subsequently, the advertiser entities select advertisements targeted to specific users based on the retrieved content information and further transmit the advertisements to the network-based entity.

In alternate embodiments, publisher entities and/or advertiser entities transmit data, such as, for example, associated taxonomy information, to the network-based entity. The entity receives the respective taxonomy Information and parses the taxonomy information to extract node information and associated categories related to the received information. Finally, the entity integrates the node information and associated categories into one or more taxonomies stored within the data storage module.

In other alternate embodiments, publisher entities and/or advertiser entities transmit data, such as, for example, associated taxonomy information, to the network-based entity. The entity receives the respective taxonomy information and parses the taxonomy information to extract node information and associated categories related to the received information. The entity further maps the node information and associated categories into corresponding nodes within one or more taxonomies stored within the data storage module. Finally, the entity stores the mapping information into a mapping database within the data storage module.

Other features and advantages of the present invention will be apparent from the accompanying drawings, and from the detailed description, which follows below.

BRIEF DESCRIPTION OF THE DRAWINGS

The present invention is illustrated by way of example and not intended to be limited by the figures of the accompanying drawings in which like references indicate similar elements and in which.

DETAILED DESCRIPTION

In the following description, numerous details are set forth for purpose of explanation. However, one of ordinary skill in the art will realize that the invention may be practiced without the use of the specific details. In other instances, well-known structures and devices are shown in block diagram form in order not to obscure the description of the invention with unnecessary detail.

Figure 1:
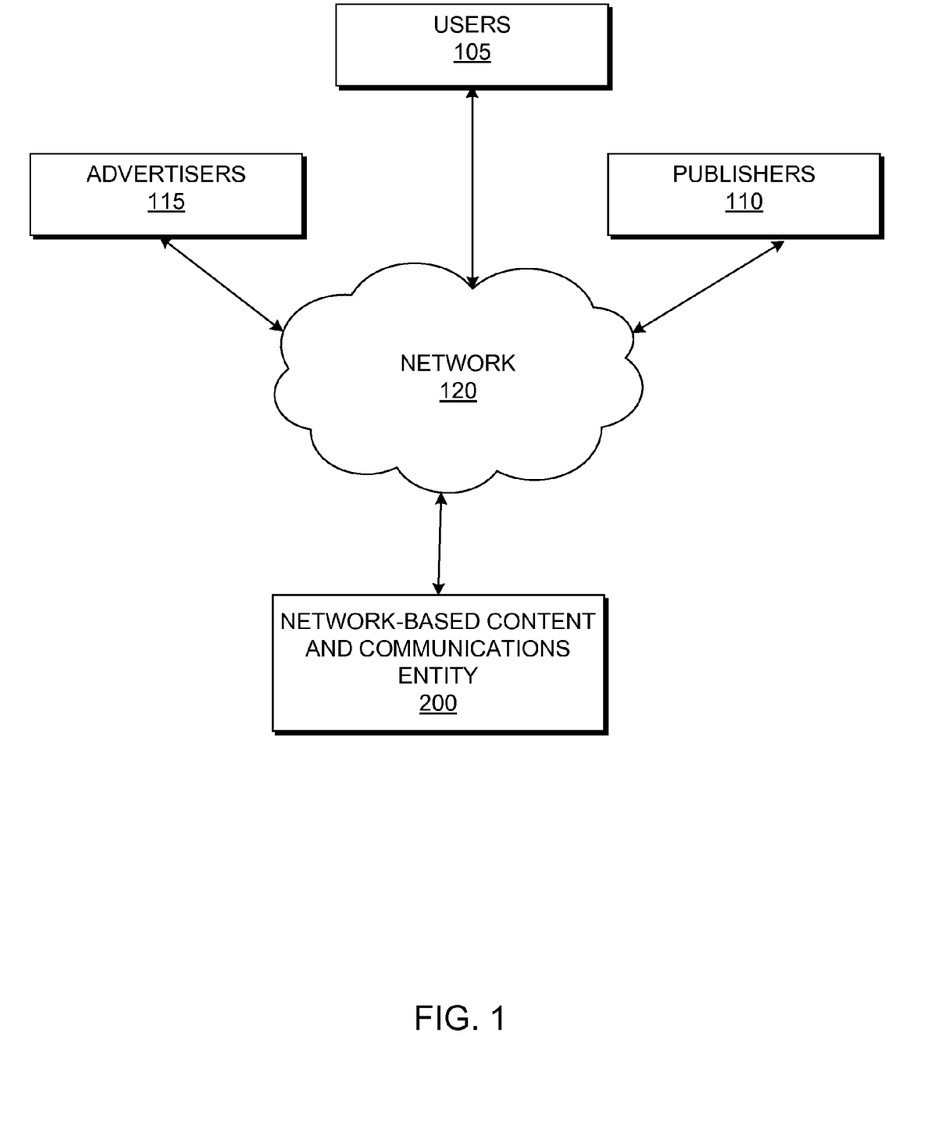
FIG. 1 is a flow diagram illustrating a network architecture, according to one embodiment of the invention.

FIG. 1 is a flow diagram illustrating a network architecture, according to one embodiment of the invention. As shown in FIG. 1, in one embodiment, one or more content providers, such as, for example, publishers 110 and/or advertisers 115, are coupled to a network-based content and communications entity 200, such as, for example, a content service provider, through a network 120, such as, for example, the Internet. Users 105 or respective agents of the users may also access the entity 130 via the network 120 and may further exchange information with the entity 200.

In embodiments described in detail below, users 105 access the network-based content and communications entity 200 and input various data, which is subsequently captured by selective servers within the network-based entity 200. The user input typically comprises one or more "events." In one embodiment, an event is a type of action initiated by a user 105, typically through a conventional mouse click command. Events include, for example, advertisement clicks, search queries, search clicks, sponsored listing clicks, page views and advertisement views. However, events, as used herein, may include any type of online navigational interaction or search-related events.

Each of such events initiated by a user 105 triggers a transfer of content information to the user 105, the content information being typically displayed in a web page on the user's client computer. The web page incorporates content provided by publishers 110, such as, for example, articles, and/or other data of interest to users, often displayed in a variety of formats, in addition, the web page may also incorporate advertisements provided on behalf of various advertisers 115 over the network 120 by an advertising agency (not shown), which may be included within the entity 200 or, in the alternative, may be coupled to the entity 200 and the advertisers 115, for example.

In embodiments described in detail below, the advertisers 115 access a data storage module within the network-based entity 200 to retrieve content information from one or more content taxonomies stored within the data storage module. Subsequently, the advertisers 115 use the retrieved content information to select advertisements targeted to the specific users 105 and further transmit the advertisements to the advertising agency.

In other embodiments described in detail below, the publishers 110 and/or the advertisers 115 transmit data, such as, for example, associated taxonomy information, to the network-based entity 200. The entity 200 receives the respective taxonomy information and parses the taxonomy information to extract node information and associated categories. Finally, the entity 200 Integrates the node information and associated categories into one or more taxonomies stored within the data storage module.

In further embodiments described in detail below, the publishers 110 and/or the advertisers 115 transmit associated taxonomy information to the network-based entity 200. The entity 200 receives the respective taxonomy information and parses the taxonomy information to extract node information and associated categories. The entity 200 further maps the node information and associated categories into corresponding nodes within one or more taxonomies stored within the data storage module. Finally, the entity stores the mapping information into a mapping database within the data storage module.

Figure 2:
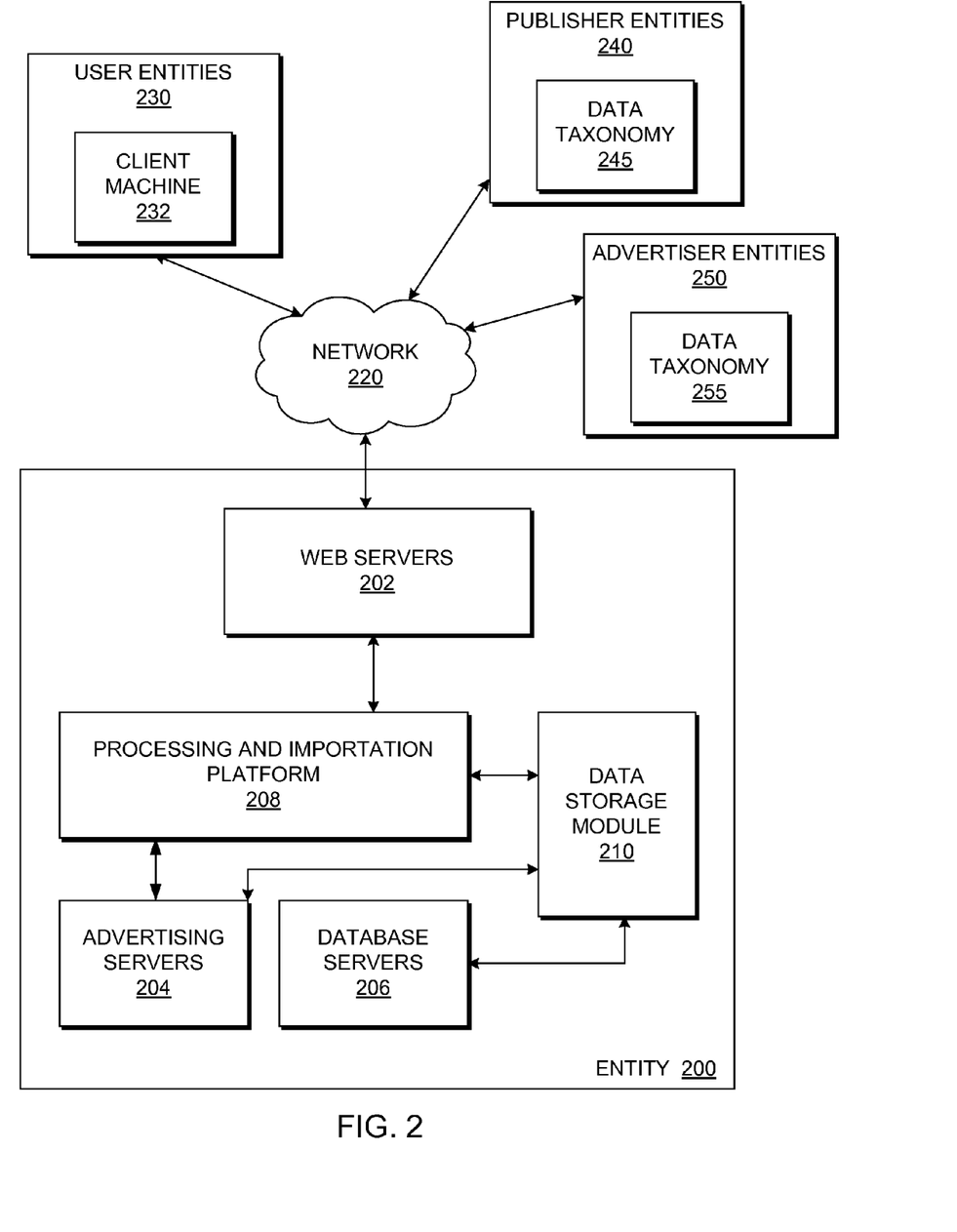
FIG. 2 is a block diagram illustrating an exemplary network-based entity containing a system to facilitate importation of data taxonomies, according to one embodiment of the invention.

FIG. 2 is a block diagram illustrating an exemplary network-based entity containing a system to facilitate importation of data taxonomies, according to one embodiment of the present invention. While an exemplary embodiment of the present invention is described within the context of an entity 200 enabling Importation of data taxonomies from publisher entitles and/or advertiser entities within the network, it will be appreciated by those skilled in the art that the Invention will find application in many different types of computer-based, and network-based, entities, such as, for example, commerce entities, content provider entities, or other known entities having a presence on the network.

In one embodiment, the entity 200 is a network content service provider, such as, for example. Yahoo! and its associated properties, and includes one or more front-end web processing servers 202, which may, for example, deliver web pages to multiple users, (e.g., markup language documents), handle search requests to the entity 200, provide automated communications to/from users of the entity 200, deliver images to be displayed within the web pages, deliver content information to the users in various formats. The entity 200 may further include other processing servers, which provide an intelligent interface to the back-end of the entity 200.

The entity 200 further includes one or more back-end servers, for example, one or more advertising servers 204, and one or more database servers 206. Each server maintains and facilitates access to one or more data storage modules 210. In one embodiment, the advertising servers 204 are coupled to the data storage module 210 and are configured to transmit and receive advertising content, such as, for example, advertisements, sponsored links, integrated links, and other known types of advertising content, to/from advertiser entities 250 via the network 220 in one embodiment, the entity 200 further includes a system to facilitate importation of data taxonomies within the network-based entity 200, as described in further detail below. The system further comprises a processing and importation platform 208 coupled to the data storage module 210. The platform 203 is further coupled to the web -servers 202 and the advertising servers 204.

The network-based entity 200 may be accessed by a client program, such as a browser (e.g., the Internet Explorer™ browser distributed by Microsoft Corporation of Redmond, Wash., Netscape's Navigator™ browser, the Mozilla™ browser, a wireless application protocol enabled browser in the case of a cellular phone, a PDA or other wireless device), that executes on a client machine 232 of a user entity 230 and accesses the entity 200 via a network 220, such as, for example, the Internet. Other examples of networks that a client may utilize to access the entity 200 includes a wide area network (WAN), a local area network (LAN), a wireless network (e.g., a cellular network), a virtual private network (VPN), the Plain Old Telephone Service (POTS) network, or other known networks.

In one embodiment, the user entities 230 access the network-based entity 200 and request a web page populated with content information. Generally, the content information is presented to the user entity 230 in a variety of formats, such as, for example, text, images, video, audio, animation, program code, data structures, hyperlinks, and other formats. The content is typically presented as a web page and may be formatted according to the Hypertext: Markup Language (HTML), the Extensible Markup Language (XML), the Standard Generalized Markup Language (SGML), or any other known language.

As used herein, advertising information is sent to the user entity 230 that requests the-web page and is intended to be relevant to the web page displayed for the user entity 230. The advertising information includes multiple advertisements, which may include a hyperlink, such as, for example, a sponsor link, an integrated link, an inside link, or other known link. The format of an advertisement may or may not be similar to the format of the content displayed on the web page and may include, for example, text advertisements, graphics advertisements, rich media advertisements, and other known types of advertisements.

Other network entities may also access the network-based entity 200 via the network 220, such as, for example, publisher entities 240, which populate the web pages transmitted to the user entities 230 with appropriate content information, and advertiser entities 250, which communicate with the web servers 202 and the advertising servers 204 to transmit advertisements to the entity 200 for further display within the web pages requested by the user.

In one embodiment, the publisher entitles 240 include one or more data taxonomies 245, which store content information necessary to populate the web pages requested by the user entities 230. Furthermore, the advertiser entities 250 include one or more respective data taxonomies 255, which store advertising information to be provided to the user entities 230 within the requested web pages.

In one embodiment, the publisher data taxonomies 245 and the advertiser data taxonomies 255 are hierarchical structures containing respective publishing information and advertising information categorized according to predetermined categories and further stored at specific category nodes within the taxonomy. For example, a data taxonomy 245 for a publisher entity 240, e.g. a newspaper, such as the New York Times, may be represented as follows:

wherein a category node "News" has several subcategory nodes, such as, for example, "Culture," "Sports," and "Politics," which store content information associated with each corresponding category. Although the content taxonomy is illustrated as a hierarchy of nodes, it is to be understood that any other representation of a taxonomy used to classify subject matter may be used in conjunction with the invention without deviating from the spirit or scope of the invention.

Figure 3:
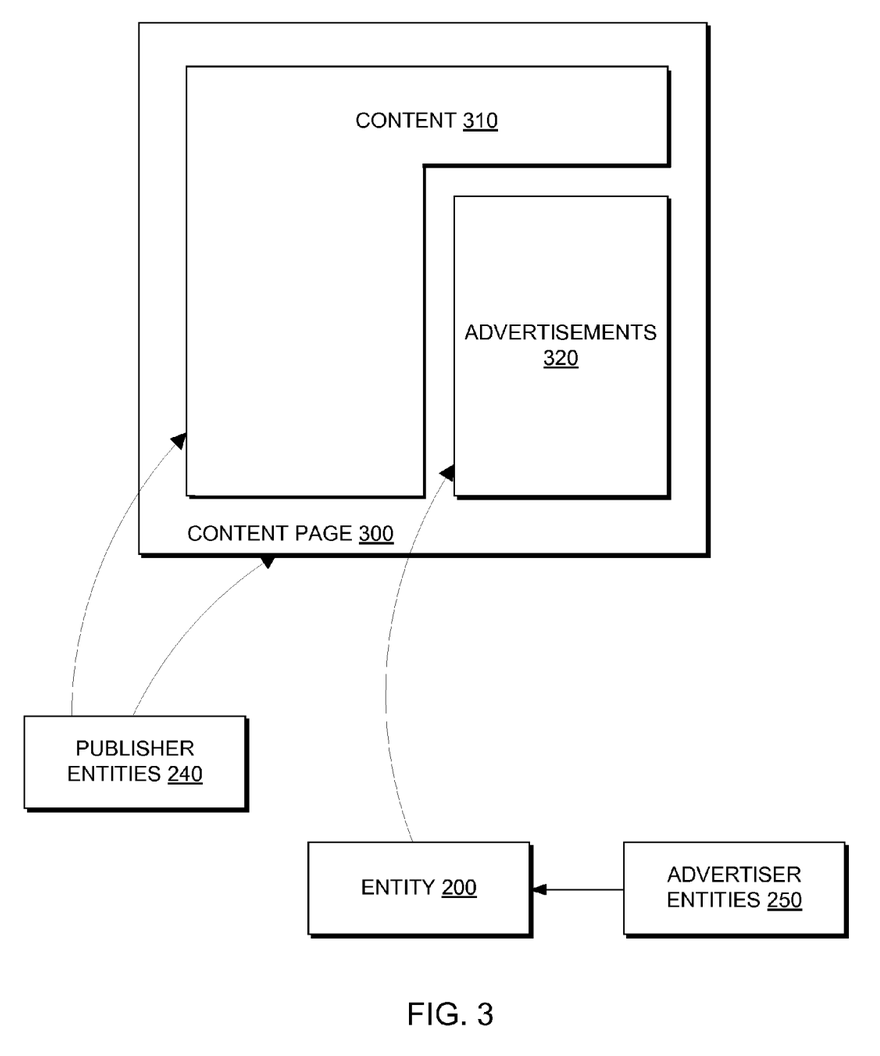
FIG. 3 is a block diagram illustrating an exemplary interface to display content and associated advertising information for the user, according to one embodiment of the invention.

FIG. 3 is a block diagram illustrating an exemplary interface to display content and associated advertising information for the user, according to one embodiment of the invention. As illustrated in FIG. 3, a content page 300, such as, for example, a web page requested by a user or an agent of the user, incorporates content information provided by the publisher entities 240 and displayed in a content area 310. In one embodiment, content may include published information, such as, for example, articles, and/or other data of interest to users, often displayed in a variety of formats, such as text, video, audio, hyperlinks, or other known formats.

The web page 300 further incorporates advertisements provided by the advertiser entities 250 via the entity 200 or, in the alternative, the advertising agency (not shown) and further displayed in an advertisements area 320. The web page 300 is composed and displayed within the client browser running on the client machine 232 associated with the user.

Figure 4:
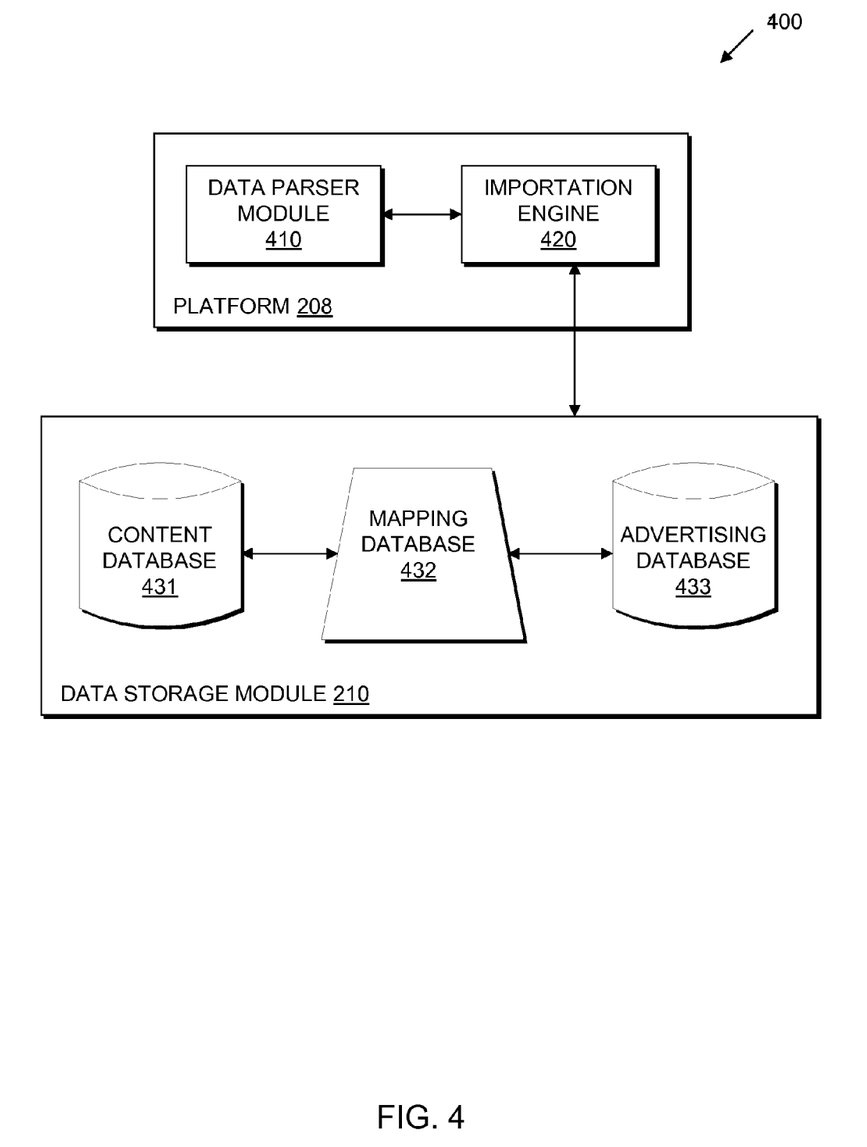
FIG. 4 is a block diagram illustrating the system to facilitate importation of data taxonomies within the network-based entity, according to one embodiment of the invention.

FIG. 4 is a block diagram illustrating the system to facilitate importation of data taxonomies within the network-based entity, according to one embodiment of the invention. As illustrated in FIG. 4, the system 400 includes the processing and importation platform 208 coupled to multiple databases within the data storage module 210, such as, for example, a content database 431, an advertising database 433, and a mapping database 432 coupled to the content database 431 and the advertising database 433, as described in further detail below. The data storage module 210 may further include other databases (not shown), such as, for example, a business rules database, a user database, supply/budget databases, and other databases specifically provided to enable functionality of the entity 200.

In one embodiment, the processing and importation platform 208 within the system 400 receives various data from the publisher entities 240 and/or the advertiser entities 250 via the front end web servers 202 and enables Importation of data taxonomies from the entities 240 and 250, as described in further detail below.

In one embodiment, the platform 208 includes several modules specifically provided to facilitate importation of data taxonomies. The platform 208 includes an importation engine 420 coupled to a data parser module 410. The data parser 410 is a hardware and/or software module configured to receive data taxonomy information from the publisher entities 240 and/or the advertiser entitles 250 and to parse the taxonomy information to retrieve node information and associated categories. The importation engine 420 is a hardware and/or software module configured to receive and process the node information and associated categories in order to enable importation of data taxonomies, as described in further detail below.

Referring back to FIG. 4, in one embodiment, each database within the data storage module 210 may, in one embodiment, be implemented as a relational database, or may, in an alternate embodiment, be implemented as a collection of objects in an object-oriented database. In one embodiment, the content database 431 indexes a plurality of web pages and associated content information, each web page being classified according to its perceived themes. The advertising database 433 stores a plurality of advertisements and associated advertising information, each advertisement being classified according to one or more themes, which characterize the general subject matter of each advertisement.

In one embodiment, the mapping database 432 stores a mapping matrix, which includes links between web pages stored within the content database 431 and corresponding advertisements stored within the advertising database 433, as described in further detail below in connection with FIG. 5.

Figure 5:
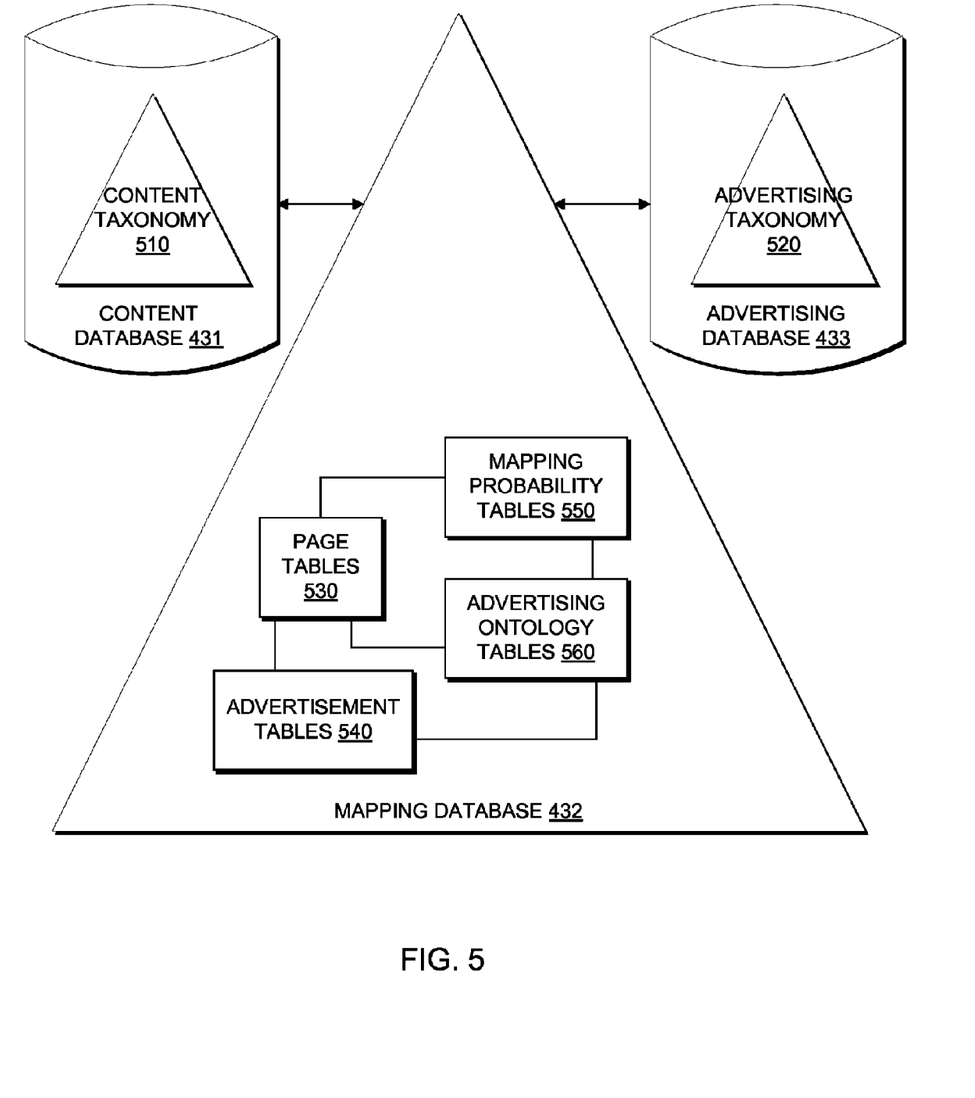
FIG. 5 is a block diagram illustrating a data storage module within the network-based entity, according to one embodiment of the invention.

FIG. 5 is a block diagram illustrating a data storage module within the network-based entity, according to one embodiment of the invention. As shown in FIG. 5, in one embodiment, the web pages and associated content information are further organized into one or more hierarchical content taxonomies 510 within the database 431 based on associations with their respective events of origin and based on various page parameters, such as, for example, page ancestors, anchor text metadata, publisher entity 240 associated with each respective web page, and other features of the stored web pages. The hierarchical content taxonomy 510 is reviewed, edited, and updated automatically by the processing and importation platform 208, or, in the alternative, manually by editors and/or other third-party entities.

In one embodiment, the advertisements are further organized into one or more hierarchical advertising taxonomies 520 within the database 433 based on various advertisement parameters, such as, for example, text of each advertisement offer, advertiser entity 250 associated with each respective advertisement, advertiser industry, and other features of the stored advertisements. The hierarchical advertising taxonomy 520 is reviewed, edited, and updated automatically by the processing and importation platform 208, or, in the alternative, manually by editors and/or other third-party entities.

The content taxonomy 510 and the advertising taxonomy 520 are represented as hierarchies of nodes. However, it is to be understood that any other representation of a taxonomy used to classify subject matter may be used in conjunction with the system 400 without deviating from the spirit or scope of the invention.

In one embodiment, the mapping database 432 may store web page information, advertisement information, and associations between the stored web page information and the advertisement information, such as probability scores indicating that certain advertisements match one or more themes of a respective web page and logical associations between advertisement information and web page information, as described in detail below.

The mapping database 432 may be implemented as a relational database, and includes a number of tables having entries, or records, that are linked by indices and keys, in an alternative embodiment, the mapping database 432 may be implemented as a collection of objects in an object-oriented database. Central to the database 432 shown in FIG. 5 are one or more page tables 530, which contain records for each web page stored within the content taxonomy 510. The database 432 also includes one or more advertisement tables 540, which may be linked to the page tables 530 and may be populated with records for each advertisement stored within the advertising taxonomy 520.

In one embodiment, the mapping database 432 may further include a number of other tables, which may also be linked to the page tables 530 and the advertisement tables 540. One or more mapping probability tables 550 are configured to store multiple probability scores, each score indicating the probability that a certain type of advertisements stored within the advertising taxonomy 520 matches the one or more themes of a respective web page stored within the content taxonomy 510. One or more advertising ontology tables 580 are configured to store logical associations between advertisements stored within the advertising taxonomy 520 and content of the web pages stored within the content taxonomy 510.

In one example, a content taxonomy 510 storing news information related to current events may be illustrated as follows:

The advertising taxonomy 520 may also contain a similar hierarchical representation and may store, for example, advertising information related to national cultural events, and/or international cultural events at respective nodes within the taxonomy 520.

Figure 6:
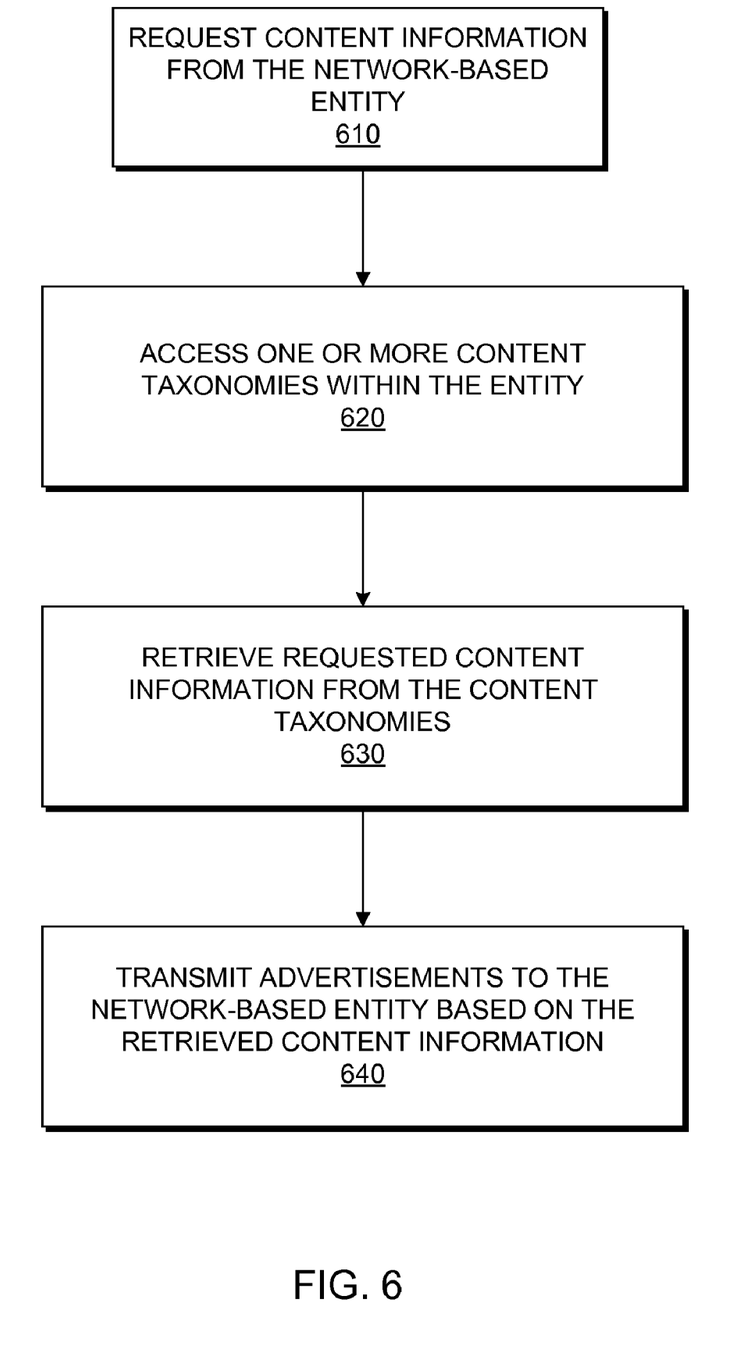
FIG. 6 is a flow diagram illustrating a method to enable automatic retrieval of content information from the network-based entity, according to one embodiment of the invention.

FIG. 8 is a flow diagram illustrating a method to enable automatic retrieval of content information from the network-based entity, according to one embodiment of the invention. As shown in FIG. 6, at processing block 610, content information is requested from the network-based entity 200. In one embodiment, the advertiser entities 250 access the entity 200 via the network 220 and the web servers 202 and request access to the content information stored within the one or more content taxonomies 510 in the content database 431. The entity 200 receives the request and enables network access to the requested content information.

At processing block 820, the content taxonomy 510 within the content database 431 is accessed. In one embodiment, the advertiser entities 250 access the content taxonomy 510 through the network 220 and the web servers 202 of the entity 200.

At processing block 630, the requested content information is retrieved from the content taxonomy 510. In one embodiment, the advertiser entitles 250 retrieve content information and associated categories from respective nodes of the content taxonomy 510.

At processing block 640, advertisements related to the retrieved content information are transmitted to the network-based entity 200. In one embodiment, the advertiser entities 250 select advertisements based on the retrieved content information and the associated categories and transmit the selected advertisements to the entity 200 via the network 220 for storage within one or more advertising taxonomies 520 and further display on the client machine 232 of the user entitles 230 in connection with web pages requested by the user entities 230.

Figure 7:
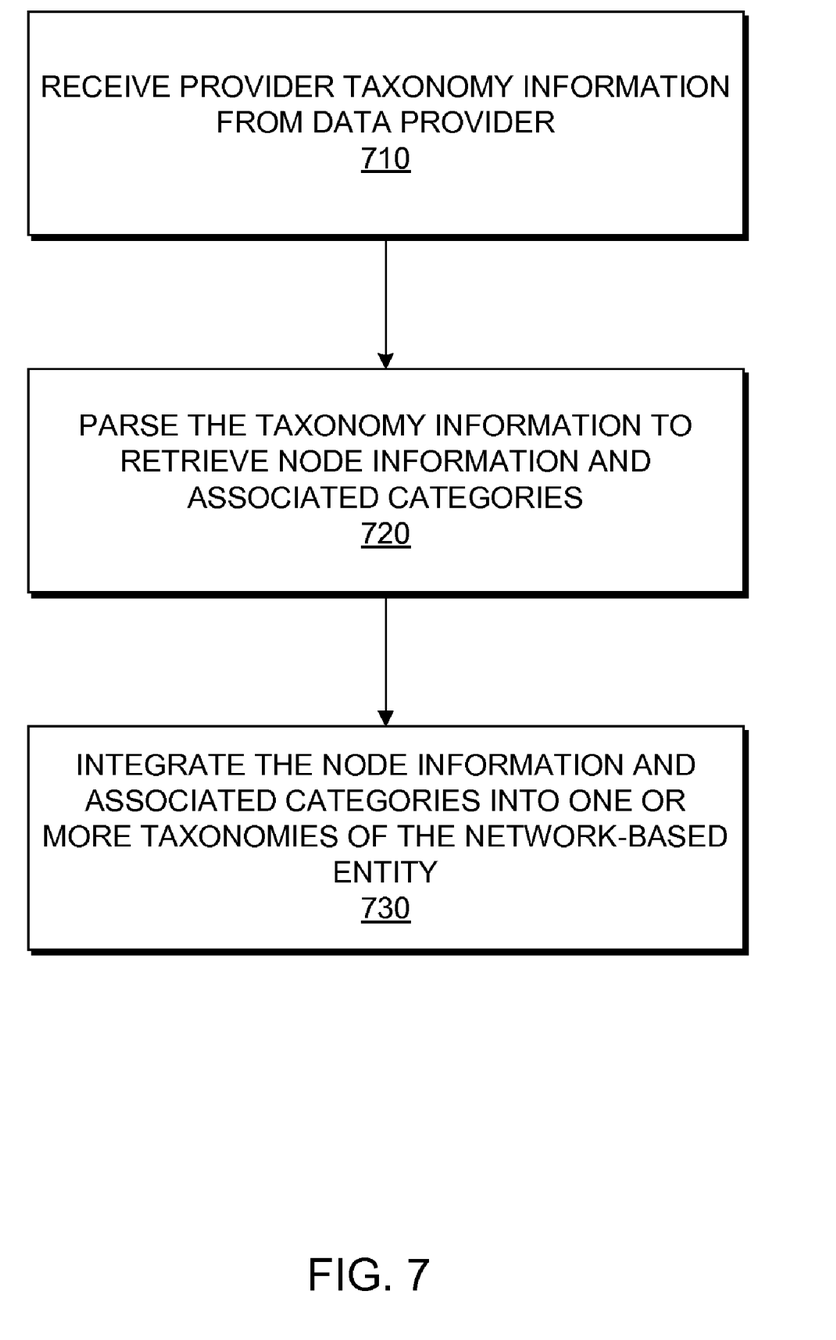
FIG. 7 is a flow diagram illustrating a method to facilitate importation of data taxonomies, according to one embodiment of the invention.

FIG. 7 is a flow diagram illustrating a method to facilitate Importation of data taxonomies, according to one embodiment of the invention. As shown in FIG. 7, at processing block 710, provider taxonomy information is received from one or more data providers, such as publisher entities 240 and/or advertiser entities 250. In one embodiment, the publisher entities 240 and/or the advertiser entities 250 transmit data taxonomy information stored within their respective publisher data taxonomy 245 and advertiser data taxonomy 255 to the entity 200 via the network 220. The web servers 202 receive the data taxonomy information and transmit the taxonomy information to the processing and importation platform 208.

At processing block 720, the taxonomy information is parsed to retrieve node information and associated categories. In one embodiment, the data parser module 410 within the processing and importation platform 208 receives the taxonomy information from the web servers 202 and parses the taxonomy information to extract node information and categories associated with the information stored at corresponding nodes within the respective publisher data taxonomy 245 and/or advertiser data taxonomy 255. The data parser module 410 further transmits the extracted node information and associated categories to the importation engine 420 within the platform 208.

At processing block 730, the node information and the associated categories are integrated within the content taxonomy 510 or, in the alternative, the advertising taxonomy 520, of the network-based entity 200. In one embodiment, the importation engine 420 within the platform 208 receives the node information and the associated categories from the data parser module 410 and integrates the received data within the content taxonomy 510 or, in the alternative, the advertising taxonomy 520, such that the node information and associated categories pertaining to the publisher entities 240 and/or the advertiser entitles 250 are appended to the current data stored within the respective taxonomies 510 and 520.

For example, considering a data taxonomy 245 for a publisher entity 240, such as the New York Times, represented below as and further considering a content taxonomy 510 within the entity 200 illustrated as follows:

the integrated result may be illustrated as follows;

wherein the node information and associated categories stored within the data taxonomy 245 of the publisher entity 240, for example, are appended to the information already stored within the content taxonomy 510.

Figure 8:
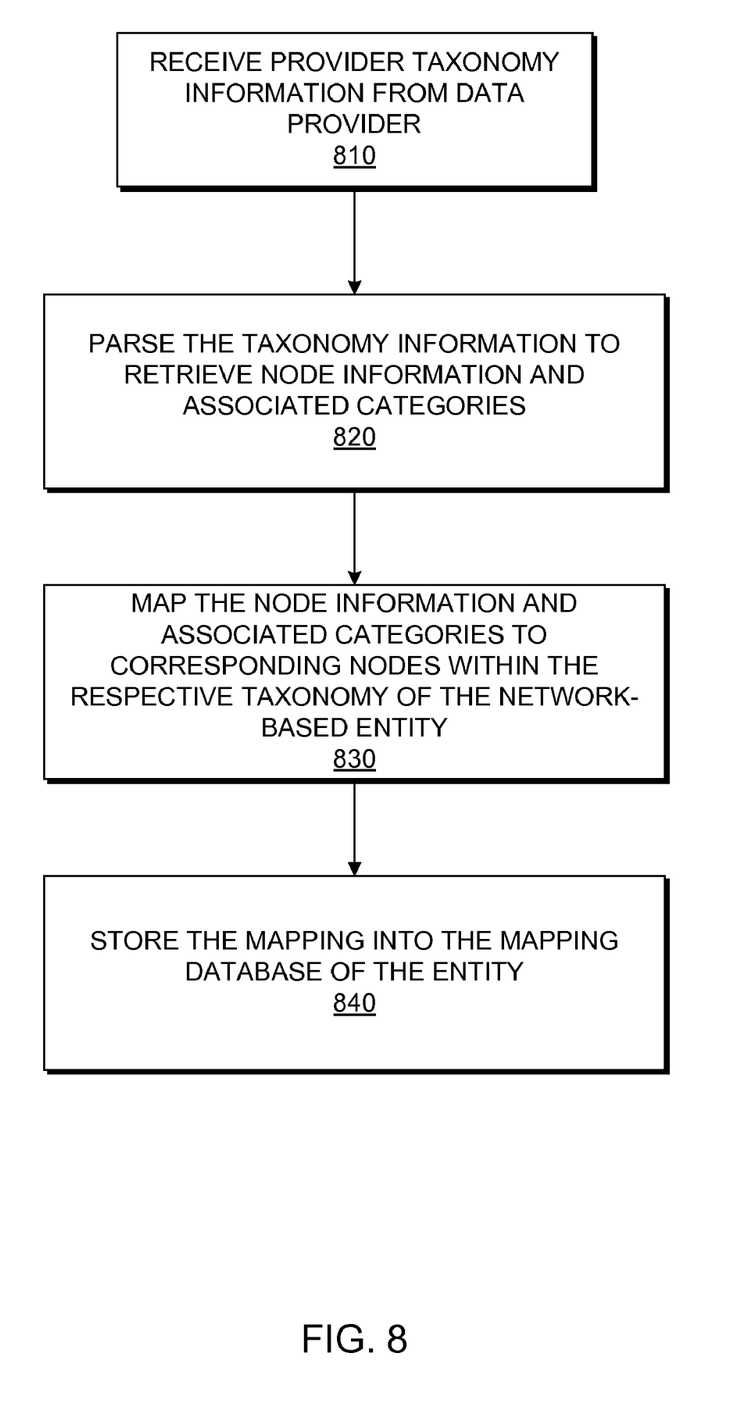
FIG. 8 is a flow diagram illustrating a method to facilitate importation of data taxonomies, according to an alternate embodiment of the invention.

FIG. 8 is a flow diagram illustrating a method to facilitate importation of data taxonomies, according to an alternate embodiment of the invention. As shown in FIG. 8, at processing block 810, provider taxonomy information is received from one or more data providers, such as publisher entities 240 and/or advertiser entities 250. In one embodiment, the publisher entities 240 and/or the advertiser entities 250 transmit data taxonomy information stored within their respective publisher data taxonomy 245 and advertiser data taxonomy 255 to the entity 200 via the network 220. The web servers 202 receive the data taxonomy information and transmit the taxonomy Information to the processing and importation platform 208.

At processing block 820, the taxonomy information is parsed to retrieve node information and associated categories. In one embodiment, the data parser module 410 within the processing and importation platform 208 receives the taxonomy information from the web servers 202 and parses the taxonomy information to extract node information and categories associated with the information stored at corresponding nodes within the respective publisher data taxonomy 245 and/or advertiser data taxonomy 255. The data parser module 410 further transmits the extracted node information and associated categories to the importation engine 420 within the platform 208.

At processing block 830, the node information and the associated categories are mapped to corresponding node information within the content taxonomy 510, or, in the alternative, the advertising taxonomy 520, of the network-based entity 200. In one embodiment, the importation engine 420 within the platform 208 receives the node information and the associated categories from the data parser module 410 and maps the received data to corresponding nodes of the content taxonomy 510 or, in the alternative, the advertising taxonomy 520, such that a mapping of the node information and associated categories pertaining to the publisher entities 240 and/or the advertiser entitles 250 to the current information stored within the respective taxonomies 510 and 520 is created within the platform 208.

At processing block 840, the mapping information is further stored within the mapping database 432 of the entity 200. In one embodiment, the importation engine 420 stores the mapping information within respective tables of the mapping database 432. For example, considering the information stored in the data taxonomy 245 and the information stored in the content taxonomy 510, both illustrated above in connection with FIG. 7, the importation engine 420 maps the "New York Times/Politics" information within the data taxonomy 245 to the "Entity/National/Politics" information and/or the "Entity/International/Politics" information within the content taxonomy 510 and stores the mapping information within respective tables of the mapping database 432.

Figure 9:
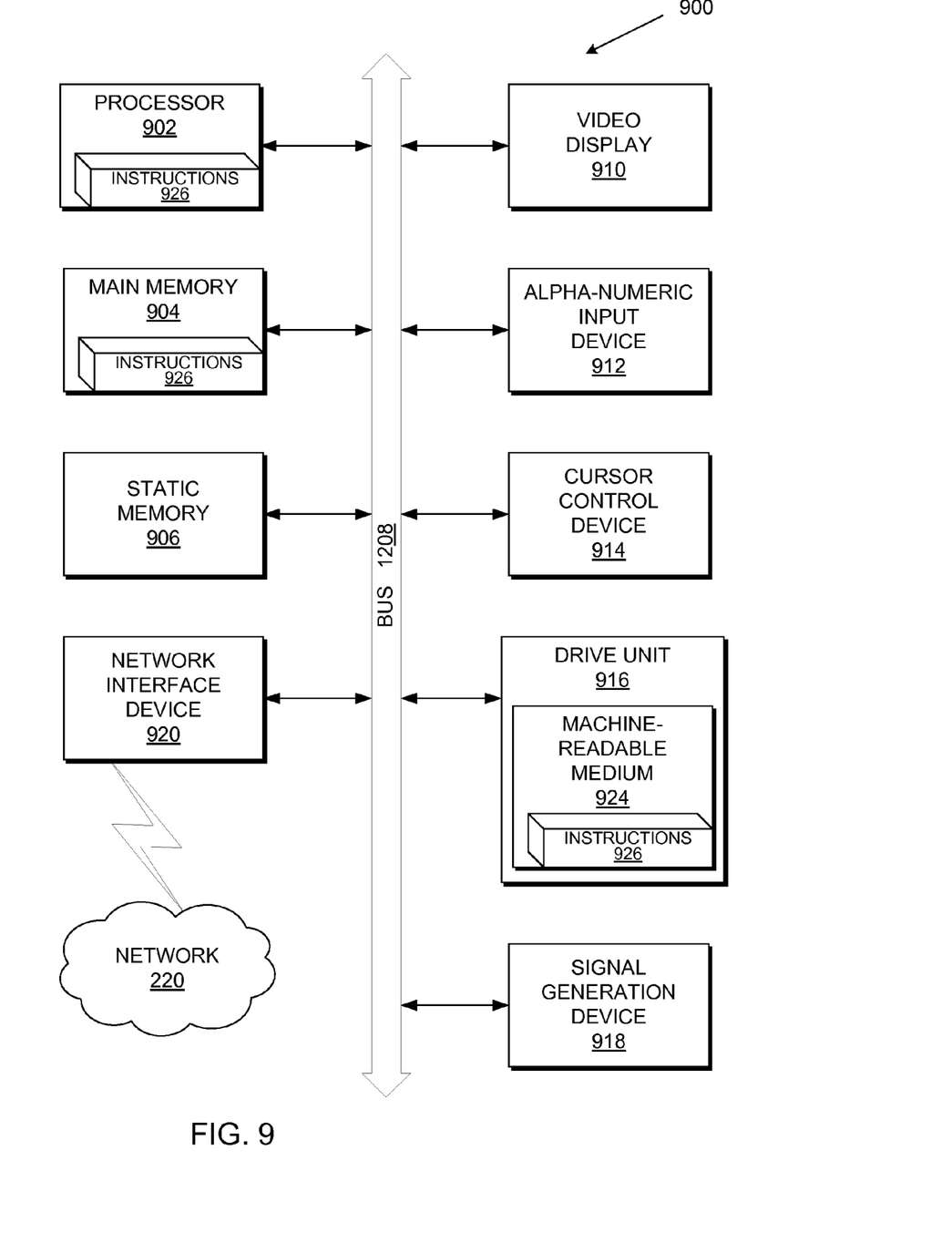
FIG. 9 is a diagrammatic representation of a machine in the exemplary form of a computer system within which a set of instructions may be executed.

FIG. 9 shows a diagrammatic representation of a machine in the exemplary form of a computer system 9200 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 900 includes a processor 902, a main memory 904 and a static memory 908, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a cursor control device 914 (e.g., a mouse), a disk drive unit 918, a signal generation device 918 (e.g., a speaker), and a network interface device 020.

The disk drive unit 918 includes a machine-readable medium 924 on which is stored a set of instructions (i.e., software) 928 embodying any one, or all, of the methodologies described above. The software 926 is also shown to reside, completely or at least partially, within the main memory 904 and/or within the processor 902. The software 928 may further be transmitted or received via the network interface device 920 over the network 220.

It is to be understood that embodiments of this invention may be used as or to support software programs executed upon some form of processing core (such as the CPU of a computer) or otherwise implemented or realized upon or within a machine or computer readable medium. A machine readable medium includes any mechanism for storing information in a form readable by a machine (e.g., a computer). For example, a machine readable medium includes read-only memory (ROM); random access memory (RAM); magnetic disk storage media; optical storage media; flash memory devices; electrical, optical or acoustical, or any other type of media suitable for storing information.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A computer implemented method comprising:
storing, at a network entity, a first taxonomy associated with at least one content publisher, for classifying content for use in delivering advertisements from said network entity, said first taxonomy comprising a plurality of nodes arranged in at least one hierarchical structure, said plurality of nodes corresponding to a plurality of categories associated with said content;
storing, at said network entity, a second taxonomy associated with at least one advertiser entity, for classifying advertisements delivered from said network entity, said second taxonomy comprising a plurality of nodes arranged in at least one hierarchical structure, said plurality of nodes corresponding to a plurality of categories associated with said advertisements;

associating, using a computer, each of the categories of the nodes of the second taxonomy with a plurality of advertisement themes;

generating mapping information, in a computer, by correlating a node of said second taxonomy to a plurality of nodes of said first taxonomy, wherein a second category corresponding to said node of said second taxonomy is related to a plurality of first categories corresponding to said nodes of said first taxonomy based on a logical association between advertisement themes of said second category and said first categories.

2. The method according to claim 1, further comprising:
parsing, in a computer, said second taxonomy to retrieve said advertisements and categories associated with data stored at corresponding nodes of said second taxonomy.

3. The method according to claim 1, further comprising:
storing said mapping information in a data storage module.

4. The method according to claim 1, further comprising:
appending said advertisements and said associated categories to current data stored within said first taxonomy.

5. The method according to claim 1, wherein generating mapping information further comprises:
creating a mapping of said advertisement information and said associated categories from said taxonomy information of said second taxonomy to corresponding nodes within said first taxonomy; and
storing said mapping within respective tables of a mapping database coupled to said first taxonomy.

6. A computer implemented method comprising:
storing, at a network entity, a first taxonomy associated with at least one content publisher, for classifying content for use in delivering advertisements from said network entity, said first taxonomy comprising a plurality of nodes arranged in at least one hierarchical structure, said plurality of nodes corresponding to a plurality of categories associated with said content;
storing, at said network entity, a second taxonomy associated with at least one advertiser entity, for classifying advertisements delivered from said network entity, said second taxonomy comprising a plurality of nodes arranged in at least one hierarchical structure, said plurality of nodes corresponding to a plurality of categories associated with said advertisements;
associating, using a computer, each of the categories of the nodes of the first taxonomy with a plurality of content themes;
generating mapping information, in a computer, correlating a node of said first taxonomy to a plurality of nodes of said second taxonomy, wherein a first category corresponding to said node of said first taxonomy is related to a plurality of second categories corresponding to said nodes of said second taxonomy based on a logical association between content themes of said first category and said second categories.

7. The computer implemented method according to claim 6, further comprising:
parsing, in a computer, said first taxonomy to retrieve said content and categories associated with data stored at corresponding nodes of said first taxonomy.

8. The computer implemented method according to claim 6, further comprising:
storing said mapping information in a data storage module.

9. The computer implemented method according to claim 6, further comprising:
appending said content and said associated categories to current data stored within said second taxonomy.

10. The computer implemented method according to claim 6, wherein generating mapping information further comprises:
creating a mapping of said content information and said associated categories from said taxonomy information of said first taxonomy to corresponding nodes within said second taxonomy; and
storing said mapping within respective tables of a mapping database coupled to said second taxonomy.

11. A computer readable medium comprising (or that stores) a set of instructions which, when executed by a computer, cause the computer to execute steps comprising:
storing, at a network entity, a first taxonomy associated with at least one content publisher, for classifying content for use in delivering advertisements from said network entity, said first taxonomy comprising a plurality of nodes arranged in at least one hierarchical structure, said plurality of nodes corresponding to a plurality of categories associated with said content;
storing, at said network entity, a second taxonomy associated with at least one advertiser entity, for classifying advertisements delivered from said network entity, said second taxonomy comprising a plurality of nodes arranged in at least one hierarchical structure, said plurality of nodes corresponding to a plurality of categories associated with said advertisements;
associating, using a computer, each of the categories of the nodes of the second taxonomy with a plurality of advertisement themes;
generating mapping information, in a computer, by correlating a node of said second taxonomy to a plurality of nodes of said first taxonomy, wherein a second category corresponding to said node of said second taxonomy is related to a plurality of first categories corresponding to said nodes of said first taxonomy based on a logical association between advertisement themes of said second category and said first categories.

12. The computer readable medium according to claim 11, the steps further comprising:
parsing, in a computer, said second taxonomy to retrieve said advertisements and categories associated with data stored at corresponding nodes of said second taxonomy.

13. The computer readable medium according to claim 11, the steps further comprising:
storing said mapping information in a data storage module.

14. The computer readable medium according to claim 11, the steps further comprising:
appending said advertisements and said associated categories to current data stored within said first taxonomy.

15. The computer readable medium according to claim 11, wherein generating mapping information further comprises:
creating a mapping of said advertisement information and said associated categories from said taxonomy information of said second taxonomy to corresponding nodes within said first taxonomy; and
storing said mapping within respective tables of a mapping database coupled to said first taxonomy.

* * * * *